April 10, 1956 P. BILLEN ET AL 2,741,363
EXTRUSION PRESS ATTACHMENTS FOR EXTRUDING PROFILES, TUBES
AND OTHER SIMILAR PRODUCTS
Filed Dec. 30, 1952
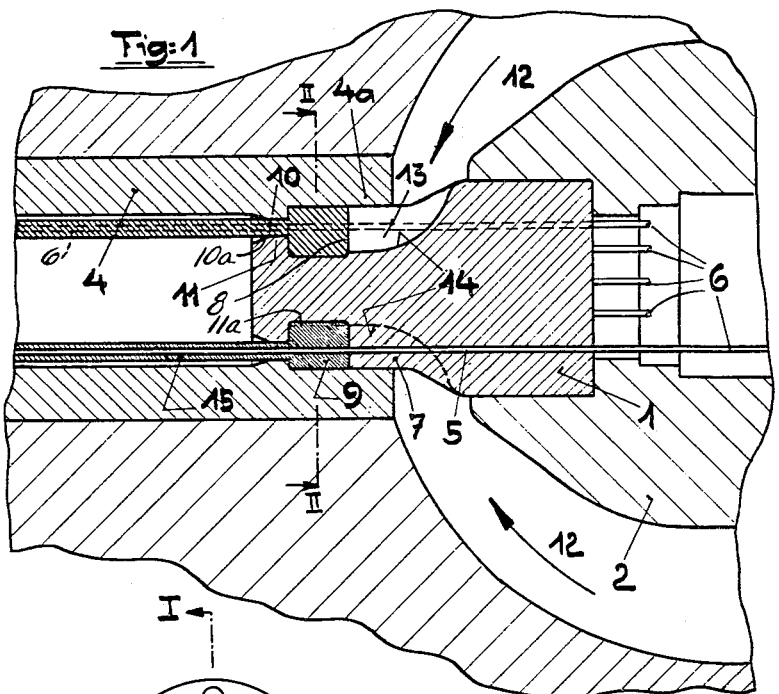
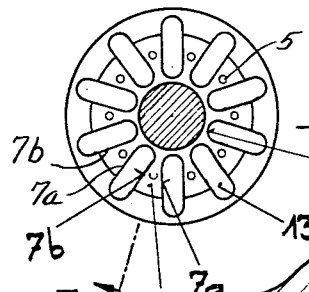
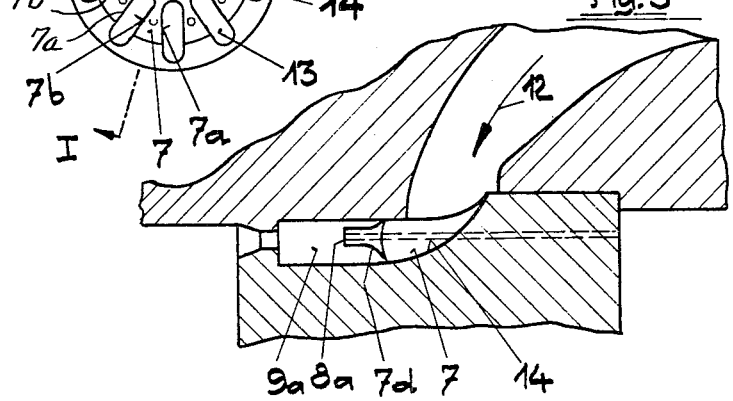
Inventors
P. Billen
W. Haendeler
By Glascock Downing Seeble
Attys.

United States Patent Office 2,741,363
Patented Apr. 10, 1956

2,741,363

EXTRUSION PRESS ATTACHMENTS FOR EXTRUDING PROFILES, TUBES AND OTHER SIMILAR PRODUCTS

Peter Billen, Leverkusen-Küppersteg, and Walter Haendeler, Dusseldorf, Germany, assignors to Schloemann Aktiengesellschaft, Dusseldorf, Germany Application December 30, 1952, Serial No. 328,616

Claims priority, application Germany January 12, 1952

8 Claims. (Cl. 207—4)

The present invention relates to the art of extruding materials, particularly metals and more particularly concerns improvements in extrusion presses for producing profiled hollow bodies such as tubes or the like.

The invention is more particularly related to an improved extrusion press for embedding during extrusion reinforcing wires in extruded bodies such as aluminum or other flowable metal tubes or the like.

Specifically this invention relates to the extrusion of hollow bodies having reinforcing wires extending longitudinally of and within the wall structure of such bodies.

The invention is based upon recognition of the fact that it is necessary to so guide the material to be extruded that it does not force the wire, which is to be utilized with the material, out of the position intended for it at any point.

Accordingly, the present invention has for an object to provide an improved material and wire guiding arrangement combined with a die means for simultaneously producing a hollow body such as a tube having a plurality of longitudinally extending reinforcing wires embedded in the wall structure of the body.

It is a specific object of this invention to provide an arrangement in which the wires are guided along respective fixed paths into an expansion chamber in front of the die outlet and the material being extruded is guided into contact with the wires on at least two opposite sides thereof whereby the wire is constrained to feed in its proper position relative to the die outlet.

It is still a more specific object to provide an arrangement for extruding hollow bodies having longitudinally extending reinforcing wires therein in which guide means extending in the extruding direction are provided for each wire, each guide means having opposite sides extending parallel to the direction of flow of material and the adjacent sides of the respective guide means constituting surfaces for guiding the material in the direction of extrusion.

It is a further specific object of this invention to provide in an extrusion press a combined mandrel and material and wire guiding structure operably associated within a matrix with the adjacent surfaces on the said structure and matrix cooperating to form a die determining the shape of the hollow body.

It is a still more specific object to provide in an extrusion press for producing hollow bodies a combined material and wire guiding means including a chamber in which the material being extruded contacts the reinforcing wires and in which the material guiding means directs the material to flow into contact with the wires from more than two sides thereof.

It is a still more specific object to provide in an extrusion press a matrix member having an inwardly extending shoulder defining the external shape of a hollow body to be produced, a mandrel member for insertion within the matrix member including at its inner end an outwardly extending shoulder terminating in a surface defining the internal shape of the body to be produced, axially rearward of said shoulders and formed between the mandrel member and the interior of the matrix a continuous chamber of larger transverse dimensions than the wall thickness of the body being produced and axially rearwardly of said chamber and embodied with said mandrel member a plurality of wire guiding means each interposed between a pair of material receiving channels whereby during simultaneous flow of material through said channels and into said chamber into contact with wires guided into said chamber material expands within the chamber and is then subjected to increased pressure in being extruded through the smaller outlet so that the wire is straightened and is firmly engaged within the material being extruded.

Further and more specific objects will be apparent from the accompanying drawings in which:

Figure 1 is a fragmentary longitudinal sectional view taken along lines I—I of Figure 2 through an associated mandrel and matrix in an extrusion press for producing a tubular body, Figure 2 is a cross-sectional view taken along lines II—II of Figure 1 but illustrating only the mandrel, and Figure 3 is a fragmentary longitudinal sectional view illustrating a modification.

The embodiment of the invention illustrated in the drawings is for producing a tube having a plurality of circumferentially spaced longitudinally extending reinforcing wires therein. It is to be understood that the invention is not to be limited to the production of tubes since profiled bodies such as those of triangular, square or other cross-sectional shapes fall within the scope of the appended claims.

Figure 1 which is a fragmentary view illustrates a mandrel member 1 carried by a mandrel holder 2 and inserted into a matrix 4 in the press. Since the illustrated form relates to a tube, the interior of the matrix 4 is cylindrical but includes portions of different diameters. From the inlet end of the matrix, a certain distance axially of its length is a portion of larger diameter which terminates in an inwardly extending shoulder 10. The inner continuous cylindrical surface of the shoulder 10 defines one part of a die or material outlet 10a. From this said inner surface the interior of the matrix diverges outwardly to form the cylindrical interior of the balance of the matrix which is of less diameter than the portion 4a.

The mandrel 1 has at its inner end an outwardly extending shoulder 11. This shoulder terminates in a continuous cylindrical surface opposite the longitudinally extending cylindrical surface of shoulder 10 and cooperates therewith to form the other part of the die outlet 10a. Axially rearwardly of the shoulder 11 the mandrel includes a portion 11a of reduced diameter and rearwardly of this reduced diameter portion the mandrel is formed with a plurality of longitudinally extending grooves or flutes which define, in circumferential alternating arrangement, material accommodating channels 13 and guide bodies 7. The guide bodies 7 and the balance of the mandrel 1 are pierced by longitudinal bores 5 accommodating reinforcing wires 6 that are drawn through the mandrel during an extruding operation. It is to be pointed out that each guide body 7 terminates in an end surface 8 axially rearwardly of the inlet end of the die orifice 10a so that between the exterior of the reduced diameter portion 11a of the mandrel and the interior of the portion 4a of the matrix there is formed an annular chamber 9 within which the material being extruded, such as aluminum, is united with the wires. In the drawing, Figure 1, the material being extruded around a wire is shown by hatching in the lower half of the figure. The material guiding channels 13 have a bottom surface 14 which is curved outwardly so that material being extruded flows through the annular passage surrounding the mandrel and its holder, into the several channels 13 and has its direction of flow changed by the curved surface 14 so that the material flows axially of the mandrel and matrix.

Each of the wire guiding bodies 7 has opposite surfaces 7a, 7b which lie in planes that converge toward one another but which are parallel to the axis of the mandrel. As shown in Figure 2, each wire guiding portion of the mandrel is between two channels 13 so that the material flows along the sides or faces 7a and 7b of adjacent wire guiding bodies 7 so that as the material passes the terminal end 8 of each wire guiding body it enters chamber 9 and is applied evenly against each wire 6 from opposite sides thereof so that the forces exerted upon each wire from opposite directions are equalized. Therefore, the wires are not forced out of the position they are intended to assume relative to the finished body. Within chamber 9, the tube product is formed; however, its final diameter and wall thickness is not obtained until the material is extruded through orifice 10a. In Figure 1 the numeral 15 denotes a cross section through a part of the finished tube. The wires 6 are circumferentially arranged in the center of the wall structure of the tube and are equally spaced from one another.

The means 7 for guiding the wires are formed integral with the mandrel, that is, they are flutes on the mandrel having longitudinally extending bores therethrough.

In Figure 3 is illustrated an arrangement in which the metal being extruded is guided to the wire concentrically thereof. In this modification, each flute or wire guide portion 7 has a forwardly extending projection or extension 7d, constructed in the form of a jet. The outer surface of this extension is spaced from the interior of the matrix and the exterior of the reduced diameter portion of the mandrel so that in effect it extends into the material receiving chamber 9a. The channels on each side of the flutes 7 are also provided with a curved bottom surface as at 14 so that material flowing in the direction of the arrow 12 is diverted to flow axially of the mandrel and through the die orifice. In flowing through the channels into the chamber 9a, the material flows around the end 8a of the extension 7d. Thus the metal being extruded flows concentrically in the direction of the wire.

It is believed obvious that certain modifications are within the scope of the appended claims. Thus the limiting faces 7a and 7b of the wire guide bodies 7 can be parallel to one another rather than as illustrated and if desired, the extension 7d in Figure 3 does not have to be of circular cross section since it can be of multi-sided configuration.

It is, therefore, clear that the present invention provides in an extrusion press a matrix and a mandrel inserted therein, adjacent the end of the mandrel an external surface defining the interior of the body to be extruded, opposite said surface the matrix having a surface defining the exterior of the body to be produced, axially rearwardly of said surfaces a continuous chamber having larger transverse dimensions that the distance between said surfaces whereby material to be extruded is subjected to pressure and communicating with said chamber a plurality of longitudinally extending material feed channels and between each channel, means for guiding reinforcing wires so that the final extruded article is a shaped hollow body having a plurality of mutually spaced reinforcing wires extending longitudinally within the wall structure thereof.

It is to be further pointed out that the exterior of the flutes 7 fits within the interior of the matrix 4 in Figure 1.

What we claim is:

1. In an extrusion press for producing hollow bodies having longitudinally extending reinforcing wires in the wall structure thereof, extrudable material and wire guiding means including means defining a continuous die orifice comprising facing surfaces delimiting the shape and wall thickness of the body to be produced, adjacent the orifice and axially rearwardly thereof as regards the direction of material flow a continuous chamber within which reinforcing wires are united with the material being extruded, said chamber having greater cross sectional area than the orifice, axially rearwardly of the chamber a plurality of mutually spaced wire guiding bodies each having a longitudinally extending wire accommodating bore therethrough and a terminal end delimiting the rearward extent of the chamber, said bodies being spaced around the axis of the chamber and including opposite longitudinally extending sides, adjacent sides of adjacent bodies constituting material guiding surfaces and defining a material guiding channel on each side of each body communicating with the chamber so that material flowing through the channels into the chamber surrounds each wire, forms a shaped body and is subjected to pressure on leaving the orifice to extrude the shaped body and draw the wires through the orifice within the wall structure of the body.

2. In an extrusion press, a matrix, a mandrel inserted therein, adjacent the end of the mandrel a continuous external surface defining the interior of a body to be extruded, the matrix having a surface thereon opposite said first mentioned surface in spaced relation thereto and defining the exterior of the body to be produced, the distance between said surfaces delimiting the wall thickness of the body, axially rearwards of said surfaces a continuous chamber of larger transverse dimensions than the distance between said surfaces so that material to be extruded is subjected to pressure in said chamber, means defining a plurality of longitudinally extending material feed channels communicating with said chamber, said channels being spaced apart around the axis of the chamber, and between adjacent channel means for guiding a reinforcing wire into the chamber and opposite the space between said surfaces so that material being extruded is guided into the chamber into contact with wires guided thereinto to form a continuous body within the chamber with the material being subjected to increased pressure in being extruded between said surfaces so that each wire is firmly engaged within the material being extruded.

3. In an extrusion press as claimed in claim 2 and the means for guiding the wires constituting longitudinally extending bodies integral with the mandrel.

4. In an extrusion press as claimed in claim 2 and the means for guiding the wires constituting solid bodies carried by the mandrel and having opposite sides extending longitudinally toward said surfaces, each body having an extension projecting forwardly thereof toward the space between said surfaces, said projection having a circular cross section.

5. In an extrusion press as claimed in claim 2 and said channels each having a depth substantially corresponding to the transverse dimension of the chamber.

6. In an extrusion press, a matrix including a reduced portion within its interior defining the exterior shape of a body to be produced, a mandrel body for insertion within the matrix including adjacent its end a surface spaced from the reduced portion of the matrix, defining the interior of the body to be produced and cooperating with said reduced portion to delimit the wall thickness of the body, said mandrel being reduced in transverse dimensions axially rearwards of said surface so as to define between the mandrel and the interior of the matrix a continuous chamber having substantially greater transverse dimensions than the space between said surface and the reduced portion of the matrix, said mandrel having a grooved body portion axially rearwardly of the chamber, said body portion including perimetrical portions engaging the interior of the matrix, the grooves each having a base extending longitudinally of the mandrel and being curved outwardly toward the perimeter thereof at an area spaced axially from the matrix, the depth of each groove substantially corresponding to the transverse dimensions of the chamber, said grooves being spaced around the perimeter of the mandrel, the portions of the mandrel body between the grooves including terminal ends within the matrix axially spaced from the reduced portion thereof to delimit one end of the chamber, each said mandrel body portion having a longitudinally extending, reinforcing wire accommodating bores therethrough in alignment with the space between the said surface and the reduced portion of the matrix whereby material being extruded flows through the grooves longitudinally of the mandrel into the chamber and surrounds reinforcing wires disposed through the bores from opposite sides thereof to form a shaped body within the chamber and the continuous flow of material extrudes the same through the space between said surface and the reduced portion of the matrix to produce the finished body having a wall thickness determined by said space and incorporating a plurality of longitudinally extending reinforcing wires firmly engaged within the material of the body.

7. In an extrusion press as claimed in claim 6 in which the body being produced is a tube, the reduced portion of the matrix constituting a cylindrical surface, said surface on the mandrel being cylindrical and the grooves and portions of the mandrel between the grooves being arranged in circumferential alternating relationship.

8. In an extrusion press as claimed in claim 6 and a tubular extension projecting forwardly of the terminal end of each portion of the mandrel between the grooves, said extensions having a bore therethrough in alignment with the respective wire accommodating bores and each extension projecting into the chamber in spaced relation with respect to the interior of the matrix and the exterior of the reduced portion of the mandrel whereby material entering the chamber concentrically surrounds the wires disposed through the extensions and within the chamber.

References Cited in the file of this patent

UNITED STATES PATENTS

| | | |
|---|---|---|
| 374,164 | Appleby | Dec. 6, 1887 |
| 814,731 | Robertson | Mar. 13, 1906 |
| 830,201 | Blondel | Sept. 4, 1906 |
| 1,872,266 | Field et al. | Aug. 16, 1932 |

FOREIGN PATENTS

| | | |
|---|---|---|
| 6,612 | Great Britain | 1909 |
| 83,476 | Sweden | May 28, 1935 |
| 437,075 | Great Britain | Oct. 23, 1935 |
| 469,213 | Great Britain | July 21, 1937 |
| 588,835 | France | May 15, 1925 |